(12) United States Patent
Herlem

(10) Patent No.: US 10,518,629 B2
(45) Date of Patent: Dec. 31, 2019

(54) MOTOR VEHICLE COOLING SYSTEM AND A SUPPORT FOR A FRONT END MODULE OF THE SAID VEHICLE DESIGNED FOR THE SAID COOLING SYSTEM

(71) Applicant: Valeo Systemes Thermiques, Le Mesnil Saint Denis (FR)

(72) Inventor: Jean-Paul Herlem, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 16/082,684

(22) PCT Filed: Feb. 27, 2017

(86) PCT No.: PCT/FR2017/050426
§ 371 (c)(1),
(2) Date: Sep. 6, 2018

(87) PCT Pub. No.: WO2017/153660
PCT Pub. Date: Sep. 14, 2017

(65) Prior Publication Data
US 2019/0100096 A1 Apr. 4, 2019

(30) Foreign Application Priority Data
Mar. 9, 2016 (FR) ...................... 16 51976

(51) Int. Cl.
*B60K 11/00* (2006.01)
*B60K 11/04* (2006.01)
(Continued)

(52) U.S. Cl.
CPC .............. *B60K 11/04* (2013.01); *B60K 11/06* (2013.01); *B60K 11/085* (2013.01); *B62D 25/084* (2013.01); *B62D 25/085* (2013.01)

(58) Field of Classification Search
CPC ....... B60K 11/04; B60K 11/085; B60K 11/06; B60K 11/00; B60K 11/08; B62D 25/085; B62D 25/084
See application file for complete search history.

(56) References Cited

U.S. PATENT DOCUMENTS 5,476,138 A * 12/1995 Iwasaki .............. B60H 1/00321
165/41
5,660,149 A * 8/1997 Lakerdas .................. F01P 5/06
123/41.44
(Continued)

FOREIGN PATENT DOCUMENTS

EP   1 216 913 A1   6/2002

OTHER PUBLICATIONS

International Search Report issued in PCT/FR2017/050426 dated May 18, 2017 (2 pages).
(Continued)

*Primary Examiner* — James M Dolak
(74) *Attorney, Agent, or Firm* — Osha Liang LLP

(57) ABSTRACT

The present invention relates to a cooling system (1) of a motor vehicle comprising heat exchange elements with at least one heat exchanger (14) designed to allow the exchange of heat between a fluid to be cooled and a flow of air, said cooling system comprising an inlet for said flow of air and an outlet for said flow of air and a housing comprising a sealed structure for encapsulating said heat exchange elements to avoid leaks of air between said inlet and said outlet for said flow of air. According to the invention, the cooling system (1) is designed to be fixed onto the support (10) of a front-end module of a motor vehicle, said support (10) forming, in the assembled position of the cooling system (1), a part of said sealed structure.

5 Claims, 1 Drawing Sheet

(51) Int. Cl.
 *B62D 25/08* (2006.01)
 *B60K 11/06* (2006.01)
 *B60K 11/08* (2006.01)

(56) References Cited

U.S. PATENT DOCUMENTS

| | | | | |
|---|---|---|---|---|
| 5,960,748 | A * | 10/1999 | Lewis | F01P 7/044 |
| | | | | 123/41.12 |
| 6,318,450 | B1 * | 11/2001 | Acre | F28D 1/0435 |
| | | | | 165/121 |
| 6,578,650 | B2 * | 6/2003 | Ozawa | B62D 25/08 |
| | | | | 180/68.1 |
| 6,789,606 | B2 * | 9/2004 | Ohki | B60K 11/04 |
| | | | | 165/41 |
| 7,117,926 | B2 * | 10/2006 | Mori | B62D 25/084 |
| | | | | 165/67 |
| 7,886,860 | B2 * | 2/2011 | Spieth | B62D 25/084 |
| | | | | 165/47 |
| 8,356,683 | B2 * | 1/2013 | Menard | B60K 11/04 |
| | | | | 180/68.4 |
| 8,403,404 | B2 * | 3/2013 | Kihara | B60K 11/04 |
| | | | | 293/115 |
| 9,162,641 | B2 * | 10/2015 | Townson | B62D 25/084 |
| 9,523,305 | B2 * | 12/2016 | Nam | F01P 5/02 |
| 9,617,907 | B2 * | 4/2017 | Nam | F28F 27/02 |
| 9,694,668 | B1 * | 7/2017 | Yun | B60K 11/04 |
| 9,925,861 | B2 * | 3/2018 | Bruckner | B60K 11/085 |
| 2003/0062148 | A1 | 4/2003 | Ohki | |

OTHER PUBLICATIONS

Written Opinion of the International Searching Authority issued in PCT/FR2017/050426 dated May 18, 2017 (5 pages).

* cited by examiner

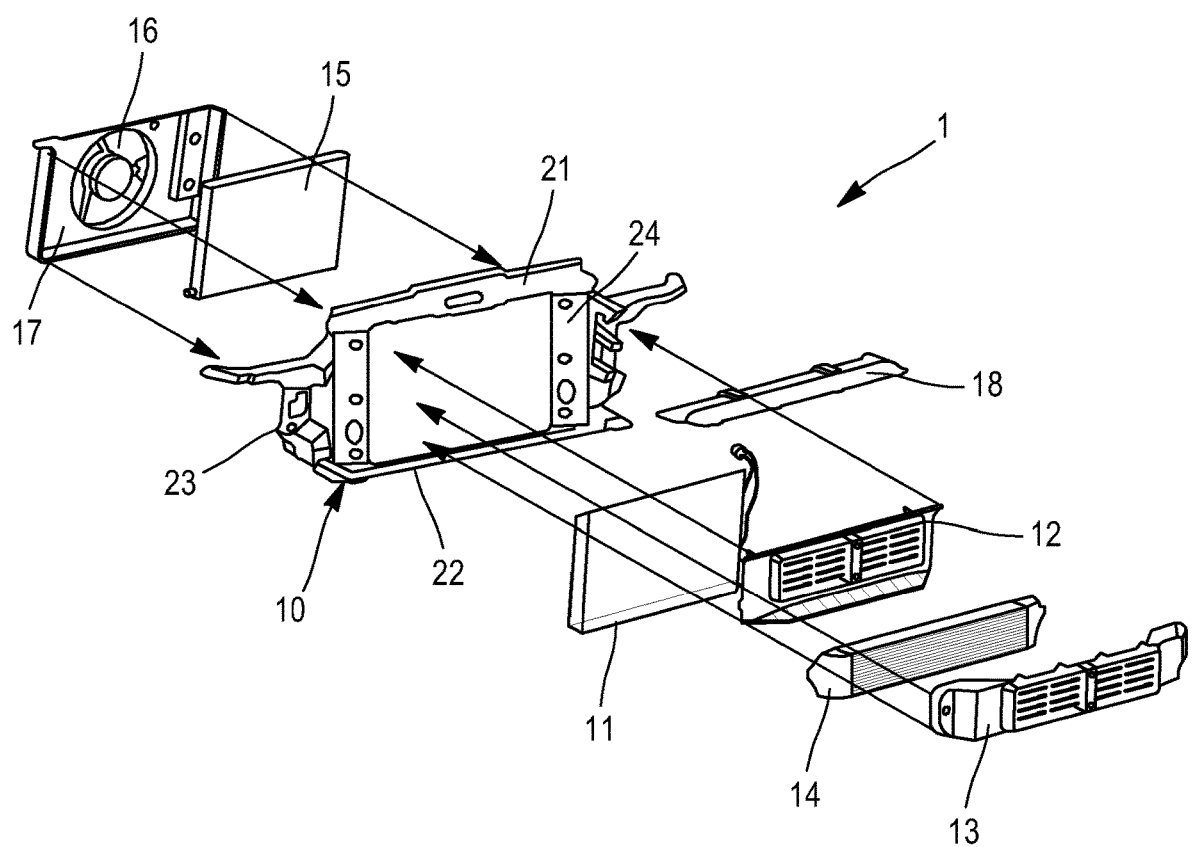

MOTOR VEHICLE COOLING SYSTEM AND A SUPPORT FOR A FRONT END MODULE OF THE SAID VEHICLE DESIGNED FOR THE SAID COOLING SYSTEM

FIELD OF THE INVENTION

The present invention relates to a cooling system of a motor vehicle and a support for a front-end module intended for said motor vehicle and designed for said cooling system.

STATE OF THE ART

Generally, a cooling system is used in a motor vehicle to cool the fluid necessary to the operation of said motor vehicle. Such a cooling system, situated on the front part of a motor vehicle, forms part of the front-end module of said vehicle. On the front end of the motor vehicle, a flow of air entering into the vehicle allows an exchange of heat with a fluid to be cooled, thus allowing the cooling of said fluid. To allow the exchange of heat between a fluid to be cooled and a flow of air, a cooling system of this type comprises at least one inlet and one outlet for said flow of air and heat exchange elements, comprising, among other things, a heat exchanger, said heat exchange elements being positioned between said inlet and said outlet.

As a general rule, the air which enters into a motor vehicle exerts a negative influence on the drag coefficient of said vehicle. Said drag coefficient is in fact proportional to the quantity of air entering into the motor vehicle, said quantity of air having to be limited in order to optimize the energy consumption of said vehicle.

Cooling systems intended for a motor vehicle have already been disclosed in the prior art. Said cooling systems comprise a housing making it possible to form a sealed structure between the air inlet and the air outlet of said cooling systems and do so, in order to optimize the exchange of heat between the flow of air used in said cooling systems and the fluid to be cooled by virtue of said cooling systems.

In the prior art, it is known practice to assemble an encapsulated cooling system and, following this assembly, to fix said cooling system in a front-end module of a motor vehicle.

In practice, the assembly of a cooling system in a front-end module of a motor vehicle involves fixing said cooling system to the support of said front-end module of said vehicle. As a general rule, such a support comprises a top crossmember, a bottom crossmember and lateral uprights forming, together, a frame. Said support of the front-end module is generally produced using a strong material such as steel or any plastic material designed to conform to the standards imposed by the regulations concerning motor vehicle safety with regard to front-end collisions between a pedestrian and a motor vehicle.

Alternatively, supports of front-end modules of a motor vehicle, produced in a hybrid material comprising a part made of plastic material and reinforcements made of metal material, are also known from the prior art. However, such a support structure represents a not inconsiderable weight in a motor vehicle.

Given the energy consumption and in order to constantly optimize the operation of the various elements of a motor vehicle, it is shown to be necessary to improve the design of a support of a front-end module of said vehicle and the fixing of a cooling system of said support of a front-end module of said motor vehicle while complying with the regulations concerning motor vehicle safety.

OBJECT OF THE INVENTION

One objective of the present invention therefore aims to remedy the abovementioned drawbacks.

Thus, a first object of the invention relates to a cooling system of a motor vehicle comprising heat exchange elements with at least one heat exchanger designed to allow the exchange of heat between a fluid to be cooled and a flow of air, said cooling system comprising an inlet for said flow of air and an outlet for said flow of air and a housing comprising a sealed structure for encapsulating said heat exchange elements to avoid leaks of air between said inlet and said outlet for said flow of air, characterized in that the cooling system is designed to be fixed onto the support of a front-end module of a motor vehicle, said support forming, in the assembled position of the cooling system, a part of said sealed structure.

According to an embodiment of the invention, the support of a front-end module of a motor vehicle comprises a top crossmember, a bottom crossmember and two lateral uprights to, together, form a frame, in which said frame is designed to form a part of said sealed structure in the assembled position of the cooling system.

According to an embodiment of the invention, the support of a front-end module of a motor vehicle comprises a plastic material.

According to an embodiment of the invention, the cooling system comprises at least one structure of mobile flaps in which the inlet of air is ensured by this at least one structure of mobile flaps.

According to an embodiment of the invention, the cooling system comprises a fan positioned on a cap in which the outlet of air is ensured by said fan.

A second object of the invention relates to a front-end module for a motor vehicle comprising the cooling system.

A third object of the invention relates to a support for a front-end module of a motor vehicle designed for the cooling system.

Other objectives will emerge, as appropriate, on reading the present description.

BRIEF DESCRIPTION OF THE DRAWINGS

The aims, objects and features of the present invention, and the advantages thereof, will become more clearly apparent on reading the present description of a preferred embodiment according to the invention, given with reference to the drawings, in which:

FIG. 1 represents an exploded view of a cooling system according to an embodiment of the invention.

DETAILED DESCRIPTION

The aim of the description below is to explain the invention sufficiently clearly and fully, in particular with the aid of examples, but should in no circumstances be considered as limiting the extent of the protection to the embodiments described hereinbelow.

In the present description, the term "cap" is used referring to the fixture for a fan. The cap, also known as "shroud", is a structure designed to position the fan and includes an opening which coincides essentially with the ends of the rotating elements of said fan.

As a general rule, in a motor vehicle, a front-end module is a structural element intended to contain a plurality of devices necessary to the optimal operation of said motor vehicle, such as headlights and a cooling system.

On completion of the production of a front-end module of a motor vehicle, said module can be assembled directly on said motor vehicle, in particular with elements of the chassis of said vehicle, such as the side bars. The front-end module can also be installed on the motor vehicle by assembly with a front bumper or fender.

As is known, the front-end module of a motor vehicle comprises a support intended to receive the device necessary to the operation of said vehicle and a bumper beam making it possible to protect said device in the case of a front-end collision.

As a general rule, the support of the front-end module comprises a bottom crossmember, lateral uprights for said bottom crossmember, a top crossmember at the top of the lateral uprights and, possibly, reinforcing arms fixed to the ends of the top crossmember and/or of the lateral uprights. Such a support of the front-end module can comprise different parts fixed together. That for example proves to be the case when the support of the front-end module is composed of steel elements.

Alternatively, the support of the front-end module can be obtained using a suitable plastic material, produced according to a molding method. It is also known practice to use front-end module supports comprising two materials in which the basic structure comprises plastic material and in which reinforcements comprise metal materials.

FIG. 1 represents an exploded view of the cooling system 1 of a motor vehicle according to an embodiment of the invention. The cooling system 1 comprises a support 10 of a front-end module forming the main element and whose objective is to receive and fix the ancillary elements of said cooling system 1 according to the invention. The support 10 comprises a top crossmember 21, a bottom crossmember 22 and two lateral uprights 23, 24. The support 10 is designed to receive and allow the fixing of elements necessary to the cooling system 1. For illustrative reasons, a few elements are shown in FIG. 1, such as the condenser 11, a structure with top mobile flaps 12, a structure with bottom mobile flaps 13.

The cooling system 1 comprises an air/air or air/water heat exchanger 14 in which an exchange of heat takes place between a first fluid to be cooled and a flow of air passing through the cooling system 1 according to FIG. 1.

The cooling system 1 according to FIG. 1 also comprises a radiator 15 and a fan 16, both positioned on a cap 17. Moreover, the cooling system 1 can have sealing elements such as a cover 18.

According to an embodiment not illustrated, it is possible for the fan 16 to be positioned on the cap 17 and for the radiator 15 to be fixed directly onto the support 10.

The cooling system 1 as represented in FIG. 1 allows the fixing of the various elements 11 to 18 onto the support 10 of the front-end module to form, together, an encapsulated cooling system. The cooling system 1 is therefore provided, by virtue of the assembly of the elements 11 to 18, with a housing, namely the support 10, comprising a sealed structure making it possible to encapsulate all of the cooling system 1 between an air inlet, formed by the top and bottom mobile flap structures 12, 13, and the air outlet, formed by the fan 16. Thus, it is easier to access any of the elements 11 to 18, for example by removing the top crossmember of the support 10 and to exchange it in case of deterioration without having to manipulate the other elements 11 to 18. In other words, the various elements 11 to 18 are mounted on the support 10 of the front-end module removably and independently of one another.

The effect of the measures described above lies in the fact that the cooling system 1 according to FIG. 1 is provided with a sealed housing or enclosure, more specifically the housing is formed by the walls of the support 10, namely the top crossmember 21, the bottom crossmember 22 and the lateral uprights 23, 24, offering a sealed structure making it possible to avoid the leaks of air between the air inlet and outlet of said cooling system 1. The bottom crossmember 22 and the lateral uprights 23, 24 form a single-piece part, that is to say that it is not possible to separate them without damaging the assembly, or, in other words, there is continuity of material between these elements, whereas the top crossmember 21 is fixed to the other walls of the support 10 removably, or, in other words, it is possible to separate the top crossmember 21 from the other walls of the support 10 without damaging the assembly. The housing or the sealed structure is formed by the various elements of the cooling system 1 which are designed to form, together, a sealed enclosure or structure. Because of this, all of the air entering into the cooling system 1 is used for an exchange of heat, thus optimizing the cooling of a fluid.

The housing, and in particular the support 10, delimits a closed volume in which the heat exchangers and other elements 11 to 18 are disposed. For that, the housing, and in particular the support 10, comprises at least one removable joining element that can, for example, be a sealing bead without joint provided with two fingers which cooperate with one another. Thus, the cooling system according to the present invention makes it possible to have access to each element, and in particular the heat exchangers, independently of one another and do so easily, which simplifies the maintenance operations to be performed on the heat exchangers.

According to a first technical effect, the use of the air entering into the cooling system for an exchange of heat is optimized, which makes it possible to use a lesser flow of air to cool a determined quantity of fluid.

According to a second technical effect lies in the fact that the various elements used in the cooling system 1 according to the invention can be underdimensioned compared to cooling systems not comprising the type of housing provided with a sealed structure making it possible to avoid the leaks.

Furthermore, in the cooling system 1 as represented in FIG. 1, the support 10 of the front-end module is an integral part of said cooling system 1 according to the invention. In other words, a construction comprising, firstly, the assembly of a cooling system and, second, the fixing of said system onto the front-end module of the motor vehicle, is avoided.

The cooling system 1 as shown in FIG. 1 is designed to allow the assembly of the various elements 11 to 18 on the front-end module 10 and thus obtain the cooling system 1 according to the invention, in which the front-end support 10 forms a part of the sealed structure around said cooling system 1.

The cooling system 1 as represented in FIG. 1 makes it possible to ensure that the use of material provided to obtain the support 10 of the front-end module is optimized in that said support offers a dual function allowing, on the one hand, the fixing of said front-end module 10 inside a motor vehicle and, on the other hand, the use of said front-end module 10 to create a sealed structure or enclosure around a cooling system 1 of said motor vehicle.

The invention claimed is:

1. A cooling system of a motor vehicle comprising heat exchange elements with at least one heat exchanger that allows an exchange of heat between a fluid to be cooled and a flow of air, said cooling system comprising:
    an inlet for said flow of air, the inlet being formed by top and bottom mobile flap structures;
    an outlet for said flow of air;
    a radiator and a fan, the radiator and fan both positioned on a cap; and
    a housing comprising a sealed structure for encapsulating the cooling system to avoid leaks of air between said inlet and said outlet for said flow of air,
    wherein the cooling system is fixed onto a support of a front-end module of the motor vehicle, said support forming, in an assembled position of the cooling system, a part of said sealed structure of the housing, and
    wherein the outlet of the flow of air is ensured by the fan.

2. The cooling system as claimed in claim 1, wherein the support of the front-end module of the motor vehicle comprises a top crossmember, a bottom crossmember and two lateral uprights to, together, form a frame, and wherein the frame forms a part of said sealed structure in the assembled position of the cooling system.

3. The cooling system as claimed in claim 1, wherein the support of the front-end module of the motor vehicle comprises a plastic material.

4. A front-end module for a motor vehicle comprising:
    a cooling system of the motor vehicle, wherein the cooling system forms part of the front-end module; the cooling system comprising:
        heat exchange elements with at least one heat exchanger that allows an exchange of heat between a fluid to be cooled and a flow of air,
        an inlet for said flow of air, the inlet being formed by top and bottom mobile flap structures;
        an outlet for said flow of air;
        a radiator and a fan, the radiator and fan both positioned on a cap; and
        a housing comprising a sealed structure for encapsulating the cooling system to avoid leaks of air between said inlet and said outlet for said flow of air,
    wherein the cooling system is fixed onto a support of the front-end module of the motor vehicle, said support forming, in an assembled position of the cooling system, a part of said sealed structure of the housing, and
    wherein the outlet of the flow of air is ensured by the fan.

5. A support for a front-end module of a motor vehicle the support being an integral part of a cooling system of the motor vehicle, the cooling system comprising:
    heat exchange elements with at least one heat exchanger that allows an exchange of heat between a fluid to be cooled and a flow of air;
    an inlet for said flow of air, the inlet being formed by top and bottom mobile flap structures;
    an outlet for said flow of air;
    a radiator and a fan, the fan being positioned on a cap and the radiator being fixed directly to the support; and
    a housing comprising a sealed structure for encapsulating the cooling system to avoid leaks of air between said inlet and said outlet for said flow of air,
    wherein the cooling system is fixed onto the support of the front-end module of the motor vehicle, said support forming, in an assembled position of the cooling system, a part of said sealed structure of the housing, and
    wherein the outlet of the flow of air is ensured by the fan.

* * * * *